(12) United States Patent
Carter, Jr.

(10) Patent No.: US 7,114,880 B2
(45) Date of Patent: Oct. 3, 2006

(54) PROCESS FOR THE EXCAVATION OF BURIED WASTE

(76) Inventor: Ernest E. Carter, Jr., 9702 Garden Row, Sugar Land, TX (US) 77478

( * ) Notice: Subject to any disclaimer, the term of this patent is extended or adjusted under 35 U.S.C. 154(b) by 59 days.

(21) Appl. No.: 10/949,095

(22) Filed: Sep. 24, 2004

(65) Prior Publication Data

US 2005/0074291 A1    Apr. 7, 2005

Related U.S. Application Data

(60) Provisional application No. 60/506,443, filed on Sep. 26, 2003.

(51) Int. Cl.
*B09B 1/00* (2006.01)
(52) U.S. Cl. .................................................. 405/129.5
(58) Field of Classification Search ............. 405/129.5, 405/129.55, 256
See application file for complete search history.

(56) References Cited

U.S. PATENT DOCUMENTS

| | | | |
|---|---|---|---|
| 2,204,781 A | 6/1940 | Wattles | 44/541 |
| 3,463,738 A | 8/1969 | Fitzgerald et al. | 588/8 |
| 3,593,799 A | 7/1971 | Bauthton et al. | 166/295 |
| 3,811,287 A | 5/1974 | DeWinter | 405/19 |
| 4,460,292 A | 7/1984 | Durham et al. | 405/129 |
| 4,900,196 A * | 2/1990 | Bridges | 405/267 |
| 5,056,960 A | 10/1991 | Marienfeld | 405/270 |
| 5,389,166 A | 2/1995 | White | 156/71 |
| 5,405,225 A | 4/1995 | Bilkenroth et al. | 405/129 |
| 5,514,412 A | 5/1996 | McArdle | 427/136 |
| 5,542,782 A | 8/1996 | Carter, Jr. et al. | 405/129 |
| 5,545,803 A | 8/1996 | Heath et al. | 588/253 |
| 5,569,811 A | 10/1996 | Dean | 588/252 |
| 5,583,283 A | 12/1996 | Hampton et al. | 73/40.5 R |
| 5,643,170 A | 7/1997 | Dean | 588/252 |
| 5,763,734 A * | 6/1998 | Nachtman et al. | 588/1 |
| 5,765,965 A | 6/1998 | Carter, Jr. et al. | 405/129 |
| 5,788,422 A | 8/1998 | Gardner et al. | 405/267 |
| 5,791,825 A | 8/1998 | Gardner et al. | 405/267 |
| 5,815,946 A | 10/1998 | Dean | 34/340 |
| 5,879,110 A * | 3/1999 | Carter, Jr. | 405/267 |
| 5,890,840 A | 4/1999 | Carter, Jr. | 405/129 |
| 5,905,184 A | 5/1999 | Carter, Jr. | 588/260 |
| 5,961,437 A | 10/1999 | Smith et al. | 588/249 |
| 6,102,617 A | 8/2000 | Hampton | 405/52 |
| 6,280,521 B1 | 8/2001 | Carter, Jr. | 106/724 |
| 6,569,235 B1 | 5/2003 | Carter, Jr. | 106/724 |
| 6,592,294 B1 * | 7/2003 | Moore | 405/129.25 |

FOREIGN PATENT DOCUMENTS

| | | |
|---|---|---|
| GB | 2046499 A | 11/1980 |
| GB | 2047946 A | 12/1980 |
| GB | 2107917 | 5/1983 |

OTHER PUBLICATIONS

Hartman, SME Mining ENgineering Handbook 2nd ed. 1992 Society for Mining Metallurgy, and Exploration, pp. 1469-1471 and 1756.*
Office of River Protection, Response to Requirement for Report to Congress Under Floyd D. Spence National Defense Authorization Act for Fiscal Year 2001, Dec. 2000.
Ernest E. Carter, Containing The Cold War's Hot Waste, Civil Engineering Magazine, Nov. 1998.
Pollution Engineering, Apr. 1998, DOD/DOE Technology; DOD/DOE Case Studies; from www.pollutionengineering.com/archives/1998/pol0401.98/suppl/case.thm; Grout Injection Technique Stabilizes Buried Waste In Situ.
Newsletter; Oak Ridge Site Technology Coordination Group, Winter 1996/1997; from www.ct.ornl.gov/stcg/nlw97.htm; Open House Highlights GAAT Technology Development.
EARTHSAW brochure, 6 pages, Federal Industrial Products and Carter Technologies Co, 2000.
Technology Alternatives Baseline Report for the 618-10 and 618-11 Burial Grounds, 300-FF-2 Operable Unit, Prepared for U.S. Department of Energy, Submitted by Bechtel Hanford, Inc., Sep. 28, 2001.
Final Environmental Impact Statement for the Tank Waste Remediation System, Hanford Home page dated Feb. 4, 2002, www.hanford.gov/eis/twrseis.htm; vol. 2, Appendix B 9.0.

* cited by examiner

Primary Examiner—John Kreck
(74) Attorney, Agent, or Firm—Howrey LLP

(57) ABSTRACT

Disclosed is a method of excavating large quantities of non-homogenous radioactive contaminated waste, desirably without releasing radioactive contaminated dust or exposing personnel to its hazards. The excavation of buried waste is performed in the presence of a suppression fluid that coats the waste and captures and retains particles so that they do not become airborne. Use of this suppression fluid technique allows larger mechanized excavation equipment to be used to perform the work. This keeps workers away from the waste. The waste is excavated and placed inside large steel boxes, such as a roll-off box, by the excavator. The suppression fluid covers the waste in the boxes and prevents particulate emissions from the waste.

28 Claims, No Drawings

PROCESS FOR THE EXCAVATION OF BURIED WASTE

CROSS-REFERENCE TO RELATED APPLICATION

This Application claims priority to U.S. Provisional patent application Ser. No. 60/506,443, which was filed on Sep. 26, 2003.

BACKGROUND OF THE INVENTION

The safe excavation of buried radioactive waste is very difficult because highly radioactive material may be dispersed and released to the air. In the past, excavation of low-level radioactive material has often been performed inside closed temporary buildings, with workers wearing protective suits and digging with tools. This can be a very labor-intensive process, and workers are protected only by protective gear and strict adherence to decontamination procedures. Excavation of very large sites could take decades to complete and require hundreds of thousands of man-hours of workers exposed to these hazards. Some waste releases large amounts of highly penetrating radiation, requiring handling by remote means. With such highly radioactive waste, conventional excavation processes might not be feasible because a protective suit might not protect the worker from the more intense radiation.

The United States Government has buried vast amounts of radioactive waste in unlined holes in the ground. Certain waste from the federal government's production of nuclear weapons is transuranic, remaining radioactive for many thousands of years. This transuranic waste may be only slightly radioactive and very hard to detect, or highly radioactive, but it still remains so for a very long time. In many cases, the federal government has entered into agreements with state and local governments that it will remove waste that is classified as transuranic from the burial sites and place the waste in specially designed facilities, such as in a salt dome or inside a mountain in another state. Removal can be difficult, however, once the waste has been buried in the ground with other non-transuranic waste in mixed layers, often up to 20 feet deep. In many cases, records may have been lost or may be incomplete. Determining what is transuranic and what is not may require digging it all up and placing it in special detection instruments.

Some transuranic waste is known to be self-dispersing due to the energetic alpha particles that essentially knock radioactive particles off the surface and create airborne dust spontaneously. Therefore, over time the interior of any building or container where the waste is stored or exposed to atmosphere may become contaminated with particles that can be hazardous to workers.

Waste at these landfills is commonly comprised of contaminated soil and debris. The debris often includes cardboard boxes, wooden crates, carbon steel drums, and other solid objects. The cardboard boxes as well as the drums are potentially decomposed to an extent that they may rupture if disturbed. The waste may contain larger pieces of debris made of metal, wood, or concrete. In some sites, large pieces of machined beryllium metal from the core of a nuclear reactor are buried. These objects may be as large as a refrigerator, highly radioactive, and contain traces of transuranic materials.

SUMMARY OF THE INVENTION

In the present invention, a method is disclosed for excavating large quantities of non-homogenous radioactive contaminated waste. In the present invention, the excavation is desirably conducted without releasing radioactive contaminated dust or exposing personnel to its hazards. In the present invention, the excavation of buried waste is performed under a pool of suppression fluid that coats both the soil and debris and desirably captures and retains particles so that they do not become airborne. Use of this suppression fluid technique allows larger mechanized excavation equipment to be used to perform the work. This keeps workers away from the waste. The waste is excavated and placed inside large, preferably steel, boxes, such as a roll-off box, by the excavator. The suppression fluid covers the waste in the boxes desirably preventing particulate emissions from the waste. In certain embodiments, the suppression fluid is comprised of molten wax.

DETAILED DESCRIPTION OF PREFERRED EMBODIMENTS

Excavation work in a landfill in accordance with the present invention would suitably begin by isolating the area to be excavated with a berm or other barrier. The presence of such a berm, while preferred, is not a necessary attribute. Some thickness of clean soil will often be excavated off the surface above the buried waste. This clean soil could be used to form the berm around the area to be excavated. Suppression fluid would then be provided to the area to be excavated. Suitably, in certain embodiments, the suppression fluid is applied in a quantity sufficient to form a liquid pool above the area to be excavated. Some portion of the suppression fluid may, and preferably does, permeate into the waste. Permeation of the suppression fluid can be augmented, if desired, by in-situ heating of the area to be excavated. In certain embodiments, suppression fluid alternatively or additionally may be introduced subterraneanly, for example, by means of a pipe driven into the waste. Subsequently, an excavating machine would reach down through the fluid and excavate the targeted waste. The excavating machine may also be adapted to stir any soil below the fluid surface with the suppression fluid. The suppression fluid/waste mixture is then excavated and placed in a suitable storage container. The container might be similar to an industrial roll-off box or it may be part of a specially designed radioactive waste shipping container or special drums. As waste is removed from the excavation, additional suppression fluid commonly would be added.

While the present invention contemplates that the application of the suppression fluid and removal of the waste can be conducted in a somewhat continuous process with the waste being removed while suppression fluid is still in a liquid state, embodiments are contemplated in which the suppression is allowed to undergo solidification prior to excavation. In such embodiments, excavation may occur prior to complete solidification. For example, some landfills contain types of waste that present a risk to groundwater, but that have no current legally acceptable disposal pathway. In accordance with one embodiment of this invention, such waste can be treated with a suppression fluid to stabilize it in place while also converting it to a form that can be safely excavated in the future. In such embodiments, a suppression fluid is desirably selected that permeates into the targeted waste. A wax-based suppression fluid is desirably used in such embodiments. Again, permeation of the suppression fluid can be augmented by in-situ heating of the area to be excavated. After permeation is complete, the suppression fluid is allowed to undergo solidification, suitably transforming into a sticky and malleable solid within the porosity of the waste. This renders the waste non-friable and non-dusty. The waste may be then be excavated in a conventional manner without generation of dangerous dust.

Excavators and other equipment can be modified with various optional equipment to facilitate their use in the process of the present invention. For example, special radiation detection instruments can be attached near the end of an excavator arm to help identify types of waste. One or more video cameras on the arm of the excavator could transmit video images of the waste being handled to monitors and recording devices in the operators cab or at a remote location. Sonar devices and infrared sensors could also be used in addition to the video cameras to extend the operators senses below the liquid surface. The excavator could be operated by remote control, but is suitably a large machine with conventional controls so that a skilled operator can receive the normal sensory feedback from the movements, rocking, and sounds of the excavator machine. The excavator could have a conventional excavator bucket or may be replaced or modified with one or more additional "thumbs" providing it the ability to grasp objects and lift them out of the suppression fluid. These thumbs may be actively operated by hydraulic cylinders or fixed, as both are common in the field of commercial excavators. The bucket and thumb hydraulic systems may be powered by a separate hydraulic circuit so that contamination will not spread to the main hydraulic system of the excavator machine. A special graphic video display may be placed in the operators cab to monitor the depth and position of the excavator arm, bucket, and any grappling thumbs below the surface of the suppression fluid to enhance operator control and visualization.

Some wooden crates or metal B-25 boxes that may be found in the waste are often quite large, up to 4 foot by 4 foot by 8 foot in size. Special excavator attachments could be used to break up wooden crates below the surface of the suppression fluid. They could also be lifted out in one piece and placed in a larger container. Very large tracked excavators capable of lifting such objects from 100 feet away are available from construction contractors. This provides the benefits of robotic excavation with the superior performance characteristics of a human operator. Special excavator attachments could also perform size reduction with cutter shears or hydraulic devices like a junkyard car crusher to squeeze the waste into smaller shapes while it is below the fluid surface. Special dual thumb excavator buckets, similar to commercial drum handling units, could also be specifically adapted to pick up drums without crushing them.

The large excavator may be used to mix the waste with a permeability reducing or stabilizing material that also serves as the suppression fluid. Instead of excavating with a bucket or clamshell type device, a dredge type pump from a barge or at the end of the excavator arm may alternatively be used to mix contaminated soil and other waste with the suppression fluid and pump it out of the excavation and into the waste container. The dredge barge could have a mechanical cutter head as is known in the art. This dredging technique could also be used as a method of mixing all the waste with suppression fluid, such as the molten wax or cement/bentonite described herein, that seals the waste and makes it impermeable. The waste would be pumped from below the surface of the suppression fluid directly into the final container. It could also be useful to have jet nozzles spraying suppression fluid, mounted on the dredge cutter head or on the bucket of the excavator, to help dislodge the soil from packages of waste.

The excavation process may be carried out in open air, in a tent, or inside a temporary building. If the process is done in open air, pumps may be used to remove rainfall from the surface of the suppression fluid. If molten suppression fluid is used, then systems to add heat to the molten pool may be needed to compensate for heat lost to the earth. Molten wax, which is a preferred suppression fluid, is a poor conductor of heat so the large pool of wax will be very slow to cool, but as the excavation proceeds ambient temperature soil and waste is added to the pool, thus reducing its average temperature. Heat addition could be done by electric heaters or by placing a large heat exchanger directly in the molten pool and circulating steam or hot water. This heat exchanger could be placed in the pool at night by the excavator machine or a crane and removed during the day while excavation proceeds.

The suppression fluid is desirably selected according to its ability to penetrate or coat the surface of the waste, as well as its ability to prevent spread of contamination into greater depths of the soil. It is most desirable that the suppression fluid should coat, penetrate, and/or wet the waste while not transporting contaminants into the ground. The preferred suppression fluid would be able to continue to coat and seal loose or friable material as it is dumped from the excavator into a container. Since large volumes of the suppression fluid are needed the cost of the fluid is also a major factor.

The suppression fluid may contain a thermoplastic material, including, for example, molten wax, molten plastics, polyethylene or other polyolefin, combinations of wax and polyolefin such as hot melt glue, or other polymer sufficiently free of crosslinking to melt and flow. Alternatively, the suppression fluid may contain one or more of a cement slurry grout, clay and water slurry mud, mixture of bentonite clay slurry with cement, latex emulsion, tar, bitumen, liquid sodium silicate, and mud made of oil and clay. The suppression fluid may also contain additives to enhance the desirable properties of these fluids.

Bentonite clay based suppression fluids could be preferred for low cost, but suppression fluids containing molten wax are preferred as a suppression fluid for performance, as such suppression fluids will generally solidify at ground temperature and thus will not penetrate very far into the soil from the excavation. Acceptable waxes include paraffin wax, microcrystalline wax, petrolatum wax, montan wax, beeswax, slack wax, Ozokerite wax, Ceresin wax, leaf wax, coal wax, vegetable wax, olefin waxes, and other synthetic and biologically produced waxes. Molten wax also waterproofs the bottom of the excavation as well as the recovered waste. This reduces concern that the suppression fluid could transport contaminants to the water table. The preferred compositions will have low viscosity and the ability to penetrate the waste within the warm area of the molten pool. The molten wax may be kept molten in the excavation by addition of heat through steam coils, electrical heaters, heat exchangers, or other common means. Wax, and other suppression fluids, may be blended or modified with additives to alter viscosity and melt point, with surfactants to improve performance in wet soil, or with bittering agents and anti-biodegradation additives to protect it from deterioration and to discourage bacterial, animal, and human intrusion.

The molten wax, or other suppression fluid, can preferably penetrate into the interior of each scoop of waste material while it is within the molten pool. This means that the wax may permeate the waste such that if the mass should break open no dusty material will be exposed. The preferred wax material may have a sticky malleable quality at ambient temperatures so that it will not crack or break and a melting point as close as practical to the maximum ambient outdoor conditions. In practice, this is likely to be between 100 degrees F. and 140 degrees F. Operating temperature of the molten pool of wax would probably be between 140 and 200 degrees F. A large onsite storage tank of molten wax could be used to keep the excavation supplied.

Gravity permeation of molten wax, or other suppression fluid, into the waste materials is primarily governed by the permeability of the waste and the viscosity of the wax as well as interactions between soil moisture and wax. Wax viscosity is a function of its molecular structure and its temperature. Wax viscosity is lower at higher temperature and increases exponentially as temperature drops to the congealing point or melting point. As wax permeates into cooler soil, it loses heat to the soil. Molten waxes can gravity flow into a permeable soil until the wax cools to near the congealing temperature. As this occurs, the permeation stops because the wax viscosity has increased to the point that gravity and capillary action are balanced by viscous fluid friction. However, if the soil has been pre-heated to the same temperature as the wax, the wax viscosity remains low and it will continue to advance through the soil due to both gravity and capillary action. When the wax reaches a non-heated or colder area, it will lose heat and permeation will cease. Waxes tend to have a low thermal conductivity but relatively high heat capacity. Thus, by means of this invention, the movement of molten wax through subterranean areas can be achieved.

Most radioactive waste packages and drums will be substantially less dense than soil or water and will float to the surface of the suppression fluid as they are dislodged from the soil. The excavator will scoop these up and place them in the container. Waste that is packed in concrete filled drums may sink to the bottom of the excavation and is found by "feel" with the excavator. The suppression fluid may contain a high density additive to produce a higher specific gravity fluid that causes more of the debris to float. Such high density additives include high density powders or particulate materials such as hematite, barite, or sand. A greater density is preferred to prevent rainwater, organic solvents, and spilled water from waste containers from sinking to the bottom of the excavation. The density of the suppression fluid also provides hydrostatic support to the sides of the excavation. Selecting a density equal to the bulk density of the soil will allow vertical or even concave sides to the excavation.

The preferred suppression fluid may also contain surfactants that enhance its ability to penetrate or permeate the waste. For wax, as well as other non-aqueous suppression fluids, the additives would enhance the ability of the wax to wet the surfaces of waste that contain water moisture. The surfactants should emulsify drops of water as an internal phase within the molten wax external phase. The preferred surfactants include those that are a solid material at ambient ground temperatures with an HLB range from 3 to 6. The preferred suppression fluid may also contain superplasticizers or other additives that reduce the viscosity.

If there is substantial fissionable material in the targeted waste, it may be desirable to add boron or other material with a high neutron cross section to reduce the potential of nuclear criticality. The preferred suppression fluids may also contain boron compounds sufficient to increase the neutron capture of the material. For suppression fluids based on wax, the boron may be in the form of an organic molecule soluble in wax, or in the form of very small particles of inorganic boron compounds, suspended in the wax. Boron compounds may be used in all suppression fluids.

Non-toxic additives that may be useful in preventing insects and rodents from digging into the suppression fluid may also be used in the suppression fluid. Such additives include bitter tasting additives such as Denatonium Benzoate or mixtures selected from the list of Benzyl diethyl [(2,6-Xylylcarbamolyl Methyl)]Ammonium Saccharide, Benzyl diethyl[(2,6-Xylylcarbamolyl Methyl)]Ammonium Benzoate, N-[(4-hydroxy-3-methoxyphenyl)methyl]-8-methyl-, (E)-; 8-Methyl-N-vanillyl-6-nonenamide, oleoresin, major capsaicinoids (070701+070706+070707), and oleoresin and capsaicin extracts. Microbial and fungal action can be discouraged by additions of suitable anti-microbials or biocides or by addition of elemental sulfur. The suppression fluid may also contain odorants to discourage intrusion.

Some types of radioactive waste may spontaneously combust when exposed to air. Coating and permeation of such materials with wax can prevent air contact and thereby prevent fire. Wax has a very high flash point but is combustible under certain conditions. Boron and other compounds may also be placed in suppression fluids, particularly wax or oil based suppression fluids, to reduce their combustibility or flash point. A Halon based or other fire suppression system may be installed on the excavator arm to put out localized fires. Molten wax itself should make an effective extinguishing agent because it will cool and exclude air from the waste. A flood system may also be installed to displace oxygen from the excavation with displacement media. Suitable displacement media would include carbon dioxide, nitrogen, other inert gases, fire fighting foam, Halon compounds, chlorofluorocarbon gas, the suppression fluid, water, or water based foam.

Bentonite, cement, and latex based suppression fluids are effective at sealing the bottom of an excavation but can have the potential to allow a finite amount of water to leak through, which can in turn help drive previously leaked contamination further downward. Constructing a bottom barrier under the waste site before the excavation begins can reduce contamination migration. This may be done by use of the techniques in U.S. Pat. No. 5,890,840, the entire contents of which are incorporated by reference herein.

As the excavation proceeds from one end of the area to be excavated to the other, clean fill soil and rock can be backfilled into the cleaned-out end of the excavation. This would displace the suppression fluid forward to the active excavation area and minimize the required volume of suppression fluid. If cement bentonite grout slurries are selected for the work, a set retarder suitable to delay setting for several weeks would be preferred. This can be achieved with a dose of between 12% and 3% lignosufonate as well as many other products known in the art. If suppression fluid containing molten wax is selected, it will automatically solidify in the filled in areas, forming a waterproof mass. If desired this mass could be excavated at any later time, without generation of dust, due to the sticky malleable wax binder. As an alternative removal technique, the wax could be mixed into the waste with a backhoe and allowed to solidify prior to final excavation.

As previously provided, the use of molten wax as a suppression fluid is a preferred embodiment of the present invention. Recognizing that other suppression fluids may be similarly employed, the use of molten wax as a suppression fluid in accordance with various embodiments of the present invention is hereafter described in greater detail.

One such embodiment contemplates situations in which the molten wax by itself cannot carry sufficient heat into the waste or soil to maintain molten conditions. Such might be the case when the waste is in disposal shafts or cylindrical holes know as "soil vaults." In such cases, the area to be excavated can be heated. This may include pre-heating the area to be excavated before introducing the wax and/or heating the area during excavation. There are several existing technologies for in-situ heating of soil. The preferred technique is to drive closed end pipes, sometimes known as heat spikes, into the ground and then place heaters in the pipes. A grid of pipes may be placed in the ground to slowly heat the volume of soil to be treated. Temperature of the pipe is preferably thermostatically controlled so that the ground will not be heated above a range that could create excessive air emissions or combustion of buried waste. Horizontal directionally drilled holes driven beneath a row of soil vaults could provide for insertion of bottom heating elements.

After the soil is hot, the wax would be allowed to flow into the heated soil. The wax could be introduced from a pool on the surface or, alternatively or additionally, be allowed to flow down one or more pipes to the bottom of the heated area. Such pipes could have one or more openings at various depths. Such openings could be closed and sealed, such as with a low melt point material, when driving the pipe, but which open when the molten wax is introduced.

The wax would permeate all of the heated soil and stop when it reaches the non-heated perimeter soil. Molten wax reaching fractures below the waste will flow only a short distance before losing enough heat to solidify. The wax-encapsulated waste may be left in place or may be excavated with reduced generation of dust, preferably without generation of dust. In small waste disposal "shafts" or "soil vaults", it is common to have un-packaged metal parts or other waste surrounded by backfilled soil. It may be possible to remove the entire treated mass in one piece by attaching lifting lugs to a crane while the surrounding soil is removed or softened.

A further embodiment involves a situation in which immediate excavation rather than only a future option to excavate is desired. Preferably, the site is first heated, suitably, as previously disclosed, using heating pipes or heat spikes. The heating pipes themselves may preferably be driven vertically with hammers or vibration, or placed horizontally with directional drilling machines. The closed-end heating pipes remain un-contaminated on the inside and thus the heaters do not become contaminated. The pipes themselves can be left in place and removed along with the excavated waste and soil. The pipes may preferably be designed to break into short sections easily to facilitate placing them in waste containers. Some pipes may be equipped with a low-pressure rupture disk to facilitate dual use as heating and injection pipes.

When performing the method on large areas, the heating pipes may be spaced in a grid up to several meters apart. Heating of large areas with maximum heater spacing and minimum heater temperatures may take 2 to 3 months. Electric heating requires significant power and it may not be necessary to heat a large site all at once. Heating pipes may be placed into the ground in advance and heating may be initiated in stages according to the anticipated rate of progress of the permeation step so that each area is heated and ready as the suppression fluid reaches it.

There are several alternatives to electric resistance heating. Electrical alternating current induction can be used to directly and uniformly heat the pipe itself. Such pipes would typically have a ceramic-insulated power wire running down their interior with an external wire connector at the top. Low frequency alternating current running through the pipe generates precisely controlled heat through alternating current impedance.

Hot fluid such as molten wax, oil, hot air, or steam may be circulated through tubing within the heating pipes. This method has the efficiency advantage of using heat directly from fuel combustion. Insulating covers, such as a layer of mulch covered with a layer of sand, may be applied over the ground surface in certain cases but generally sites have a cover of clean soil that will provide sufficient insulation.

The molten wax may be introduced by pouring it on the surface of the heated soil area or introducing it through pipes as in previously described embodiments. The preferred method is to introduce it through a long concrete pumping boom to the surface of the area to be excavated. The delivered molten wax will begin permeating into the heated soil. When the wax begins to pool at the surface, an excavation machine would begin excavating out the wax-permeated soil. As the excavation expands, more molten wax is placed into the excavation to maintain it fill of liquid molten wax.

Molten wax will provide only temporary hydrostatic support to the excavation in the heated soil because it continues to permeate laterally through the soil. The permeated material experiences little differential pressure and tends to loose cohesion so it will slough off into the excavation. This material will slough to the bottom of the excavation where it may be scooped up by a large excavator machine. However, at the boundary between heated areas and un-heated areas, the wax will cool and stop its permeation. Therefore, the hydrostatic head of the molten wax pool will provide a measure of lateral support to the perimeter walls of the excavation and also may create a firm bottom. While the hot wax-permeated soil will become very soft, the perimeter boundary with the unheated soil will cool due to the insulating effect of the wax and remain hard, or in the case of non-cohesive soil, will become hard due to the solidified wax. This difference will help the excavator operator distinguish between waste to be removed and the bottom of the excavation. The excavation rate may exceed the rate of permeation, but in a large project, permeation may preferably be allowed to advance ahead of the excavation. This will cause the excavation face to continually slough to the bottom of the pool to be removed by the excavator. However, some buried objects will float and these can be scooped up at the surface of the molten pool.

As the excavation proceeds, a large pool of molten wax will be generated. Since this material is both expensive and potentially contaminated, it is desirable to minimize it. A low cost displacement grout can be placed into the excavation to push the molten wax forward into the heated soils, that is to move the suppression fluid from one section within the area to be excavated into another section of the area to be excavated. It should be understood that the displacement grout could be almost any fluidized substance that has a sufficient density and flow properties to allow it to displace the molten wax, or other suppression fluid. When the suppression fluid is molten wax, this displacement grout is preferably made from a bentonite slurry mixed with native soil in a proportion to make the slurry sufficiently viscous and plastic that continuing to introduce it along one end of the excavation will create a continuous wave front of the grout across the width of the excavation, displacing the molten wax forward. The advantage of this "continuous wave front" is that only the wave front contacts the potentially contaminated wax. The bulk of the displacement grout remains free from potential contamination. The displacement grout is preferably placed at the beginning of the excavation by a concrete pumping boom or similar device so that workers do not have to approach the work area. The molten wax may be displaced through a shallow ditch into a second pre-heated waste area to recover and reuse wax. During the course of a large project, it may be desirable to shut down the project for a time. In such as case, the molten wax in the excavation can be displaced forward into the next heated zone of soil and the heaters left on to maintain temperature until the project is ready to resume.

The molten excavation method is especially well adapted for waste types known as vertical pipe units. The are essentially vertical structures, commonly made of five steel drums welded together, buried on 10-foot centers in long rows. Heaters may be installed very close to the vertical pipe units to heat only the waste and the soil very near it. A large excavator would create a long ditch excavation along the centerline of the row and place the waste into disposal boxes. The molten wax will support the walls of the excavation in the unheated areas, while allowing the soil to cave freely in the heated areas.

In another embodiment, molten wax is applied to the area to be excavated and allowed to flow into the underlying waste by means of gravity. In this method, the wax itself carries enough heat to maintain the molten, low viscosity, condition until the desired areas have been permeated. Certain transuranic waste sites consist of low specific gravity waste packages such as drums and boxes that are neatly stacked with substantial void spaces between packages. The overall packages themselves are often low in average density and have low heat capacity. At the Los Alamos National Laboratory, such trenches have been carved out of dry volcanic tuff that also has a low heat capacity. A simple pipe driven into one or more of the void spaces within such waste may be attached to a large supply of molten wax. Several such pipes might be used for large sites. The wax will gravity permeate into the waste and initially fill the void spaces around the waste packages. If the heat carried by the molten wax is substantially greater than that lost to heat the packages, the wax will remain hot enough to retain its low viscosity. Any temperature substantially above the melt point and below the flash point of the wax may be used. For a wax with a melting point of 125 degrees F., an injection temperature between 180 degrees F. and 320 degrees F. is contemplated. The low viscosity wax will infiltrate the non-impervious packages and isolate all the packages in a waterproof and airtight mass. The molten wax will then permeate into the surrounding volcanic tuff rock for a short distance before loss of heat cools it enough to stop the flow, thus forming an additional barrier in the rock on both the sides and bottom of the original excavation.

In accordance with this embodiment, the process can also be carried out in stages with the first stage filling only a portion of the vertical depth of the trench, so that excessive buoyancy forces do not cause any heave of the surface. Temperature sensors may be driven into the waste trench to monitor the progress of the molten wax fill and determine when the first lift of wax has solidified enough that a second lift may be allowed to flow. Gravity flow is preferred to prevent molten wax from returning to the surface through a fracture, however practical application may use the pressurized flow directly from a standard tank truck or transfer pump. Once the waste has been fully impregnated with wax and cooled to ambient temperature, it may be left in place, or it may be removed by excavation. If the wax is designed to remain slightly sticky, conventional excavation should not produce any fugitive dust.

During excavation of areas that may not have been permeated with suppression fluid, or of containers that have been broken or sheared open by excavation, additional suppression fluid may be continually sprayed on to the face of the excavation to help prevent dust generation. The suppression fluid would preferably be applied in a large stream, as from a fire hose. This secondary application of molten wax is preferably at as high a temperature as practical to maximize permeation into the surface of the soil and waste.

One type of radioactive waste that could be excavated with this invention is a reactor block made of beryllium metal. These blocks may be buried in waste trenches with other assorted waste or in cylindrical holes with other metal parts and drums. The metal blocks typically weigh only a few hundred pounds because they have many machined holes. If one were being removed from a waste trench containing other undocumented waste, the backhoe operator may have to remove a substantial amount of other waste before reaching the block. This waste could be placed in storage containers or returned to the burial trench coated with suppression fluid. A skilled backhoe operator could locate a large solid object by "touch" and remove it with a large backhoe equipped with a grappling thumb.

When waste is excavated, it can be placed directly into large containers and sorted according to visual appearance and radioactive emissions. In a preferred embodiment, these boxes would be a type of roll-off box optimized to be picked up, transported and unloaded by a special hook-loader truck that does not require workers to get out of the truck or approach the container. Radiation detection systems could be installed in a large ISO ocean shipping container sized to fit the special roll-off box.

What is claimed is:

1. A method of excavating waste from an area of land with an excavator comprising the steps of:
    heating the area of land containing the waste to be excavated;
    covering at least a portion of the heated area containing the waste to be excavated with a pool of suppression fluid comprising a thermoplastic material;
    extending the excavator through the suppression fluid and into the heated area; and
    removing the excavated waste.

2. The method of claim 1 wherein the waste comprises radioactive materials.

3. The method of claim 1 wherein removal of the excavated waste is achieved without releasing contaminated particulate dust.

4. The method of claim 1 wherein the excavated waste is placed in a container.

5. The method of claim 1 wherein the suppression fluid coats an exterior surface of the excavated waste.

6. The method of claim 1 wherein the suppression fluid partially permeates an exterior surface of the excavated waste.

7. The method of claim 1 wherein the thermoplastic material comprises molten wax.

8. The method of claim 7 wherein the molten wax comprises paraffin wax, microcrystalline wax, montan wax, beeswax, slack wax, Ozokerite wax, Ceresin wax, leaf wax, coal wax, vegetable wax, olefin wax, or petrolatum.

9. The method of claim 1 wherein the suppression fluid further comprises a set retarder or a superplasticizer.

10. The method of claim 1 wherein the suppression fluid is mixed with the waste or is allowed to permeate into the waste before the waste is removed.

11. The method of claim 10 wherein the suppression fluid is allowed to at least partially solidify before the waste is removed.

12. The method of claim 1 wherein the suppression fluid further comprises boron.

13. The method of claim 1 wherein the suppression fluid further comprises a material with a high neutron cross section.

14. The method of claim 1 wherein the suppression fluid further comprises a surfactant.

15. The method of claim 1 wherein the excavator has at least one opposable thumb.

16. The method of claim 1 wherein the suppression fluid further comprises a high density additive.

17. The method of claim 1 wherein additional suppression fluid is applied to the excavated waste.

18. The method of claim 1 further comprising applying a displacement grout within the space from which the excavated waste was removed.

19. The method of claim 1 wherein heating the area of land comprises the use of pipes driven into the ground.

20. A method of excavating waste buried in an area of land with an excavator comprising the steps of:
heating the area of land containing the waste to be excavated;
applying a suppression fluid comprising thermoplastic material subterraneanly to at least a portion of the heated area containing the waste;
extending the excavator into the heated area; and
removing the excavated waste.

21. The method of claim 20 wherein the thermoplastic material comprises molten wax.

22. The method of claim 20 wherein the waste comprises radioactive materials.

23. The method of claim 20 wherein the suppression fluid is allowed to permeate into the waste before the waste is removed.

24. The method of claim 20 wherein the suppression fluid is allowed to at least partially solidify before the waste is removed.

25. A method comprising the steps of:
heating an area of land containing waste to a temperature between 140 and 200 degrees Fahrenheit;
covering at least a portion of the heated area containing the waste with a pool of suppression fluid comprising a thermoplastic material; and
allowing the suppression fluid to subterraneanly permeate into the heated area.

26. The method of claim 25, wherein the area of land is heated to a temperature greater than the melting point of the thermoplastic material.

27. A method comprising the steps of:
heating an area of land containing waste to a temperature between 140 and 200 degrees Fahrenheit;
applying a suppression fluid comprising thermoplastic material subterraneanly to at least a portion of the heated area containing the waste;
allowing the suppression fluid to permeate into the heated area.

28. The method of claim 27, wherein the area of land is heated to a temperature greater than the melting point of the thermoplastic material.

* * * * *